United States Patent [19]

Kobayashi et al.

[11] 4,348,623
[45] Sep. 7, 1982

[54] NUMERICAL CONTROL SYSTEM FOR CONTROLLING BOTH A MACHINE TOOL AND A ROBOT

[75] Inventors: Kengo Kobayashi, Kawasaki; Hajimu Inaba, Hino; Shinsuke Sakakibara, Kunitachi, all of Japan

[73] Assignee: Fujitsu Fanuc Limited, Tokyo, Japan

[21] Appl. No.: 165,989

[22] Filed: Jul. 7, 1980

[30] Foreign Application Priority Data

Jul. 10, 1979 [JP] Japan .................................. 54-87319

[51] Int. Cl.³ .............................................. G05B 19/42
[52] U.S. Cl. .................... 318/568; 318/590; 364/474
[58] Field of Search ............... 318/568, 567, 571, 562, 318/590; 364/474, 475

[56] References Cited

U.S. PATENT DOCUMENTS

| | | | |
|---|---|---|---|
| 3,372,568 | 3/1968 | Lemelson | 318/562 X |
| 3,727,119 | 4/1973 | Stanley et al. | 318/562 |
| 3,760,251 | 9/1973 | Posi et al. | 318/562 X |
| 3,934,186 | 1/1976 | Hayakawa et al. | 318/567 |
| 3,944,799 | 3/1976 | Brownell | 318/603 X |
| 4,011,437 | 3/1977 | Hohn | 318/568 X |
| 4,178,632 | 12/1979 | Anthony | 318/568 X |
| 4,208,718 | 6/1980 | Chung | 318/571 X |
| 4,224,501 | 9/1980 | Lindbom et al. | 318/568 X |

FOREIGN PATENT DOCUMENTS 2904770 8/1979 Fed. Rep. of Germany ...... 318/568

*Primary Examiner*—B. Dobeck
*Attorney, Agent, or Firm*—Staas and Halsey

[57] ABSTRACT

A numerical control system comprising a numerical control device, a machine tool for machining a workpiece under the control of the numerical control device, and a robot for executing various tasks such as mounting the workpiece on the machine tool or demounting the workpiece therefrom. The numerical control device, in addition to the hardware which it possesses for controlling the machine tool, is further provided with a teaching control panel, a heavy current circuit which handles the exchange of data between the numerical control device and the robot, and a switching control circuit for switching over the output side of a pulse distributing circuit so that the pulse distributing circuit can be used in controlling both the robot and the machine tool. Machining data for control of the machine tool and data for commanding the robot are stored in a memory device incorporated in the numerical control device, or in a storage medium which is located externally of the system. The stored data can be read out in succession to designate the machine tool, which will then perform a machining operation, or to designate the robot which will respond by executing a prescribed task or tasks.

11 Claims, 7 Drawing Figures

NUMERICAL CONTROL SYSTEM FOR CONTROLLING BOTH A MACHINE TOOL AND A ROBOT

BACKGROUND OF THE INVENTION

This invention relates to a numerical control system, and more particularly to a numerical control system which enables both a machine tool and a robot to be controlled by a single numerical control device.

Numerical control systems often comprise a numerical control device, a machine tool, which is controlled by the numerical control device so as to machine a workpiece, and a robot for mounting workpieces on the machine tool and demounting the workpieces from the machine tool, for exchanging tools, for cleaning scraps produced by the machining operation, and for various other tasks. Ordinarily, such numerical control systems are separate, with a robot control device exclusively for controlling the robot. The robot control device causes the robot to execute the above tasks by controlling the vertical movement of the robot arm, the swinging motion of the arm to the left and right, the rotation of a wrist, the shaking of a hand mechanism, the opening and closing of fingers provided on the hand mechanism, and the like. The robot control device also controls editing, such as the deletion and correction of robot command data, as well as the teaching of robot command data. The device is therefore composed of large quantities of hardware such as a processing circuit, a memory and a pulse distributing circuit, which raise the cost of the device and, hence, the cost of the overall system. This has impeded the wider use of robot systems.

It should be noted, however, that the hardware, such as the processing circuit, memory and pulse distributing circuit, which is necessary for a robot control device is almost entirely incorporated in the conventional numerical control devices. Thus, it should be possible to greatly reduce the cost of an overall system if a numerical control device could be furnished with the function of the robot control device by the addition of a minimum amount of necessary hardware.

SUMMARY OF THE INVENTION

Accordingly, it is an object of the present invention to eliminate a separate robot control device from a numerical control system by supplementing a numerical control device with the hardware necessary for controlling a robot.

It is another object of the present invention to make common use of a single pulse distributing circuit in the control of both a robot and a machine tool so as to greatly reduce the cost of the overall system.

It is still another object of the present invention to provide a numerical control system which is capable of so-called playback control, wherein a numerical control device is connected to a teaching control panel and to heavy current circuitry which administers the transfer of data between a robot and the numerical control device. The robot command data from the teaching control panel is stored in the data memory of the numerical control device, the robot command data being read out successively from the data memory and applied to the robot through the heavy current circuitry so that the robot is caused to perform various tasks such as the loading and unloading of workpieces.

It is a further object of the present invention to provide a numerical control system in which machining data, for the control of a machine tool, and robot command data, which have been input separately in a numerical control device, are edited into a single set of combined data on the basis of which the machine tool and robot are controlled, the edited data being stored in a non-volatile external storage medium such as a magnetic bubble memory.

In accordance with one feature of the invention, transfer of the the edited data to the external storage medium for the purpose of storing the data permits the execution of identical machining and robot tasks at a later date merely by transferring the command data from the external storage medium back to the data memory of the numerical control device, whereby it is possible to eliminate the teaching of the robot and other such operations at the later date.

Other features and advantages of the invention will be apparent from the following description taken in conjunction with the accompanying drawings.

DETAILED DESCRIPTION OF THE PREFERRED EMBODIMENT

Figure 1:
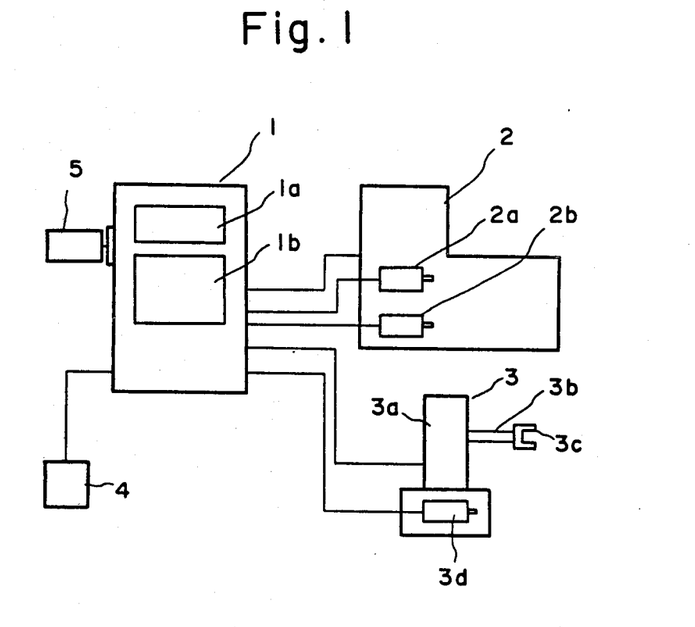
FIG. 1 is an overall view of a numerical control system in accordance with the present invention.
Figure 2:
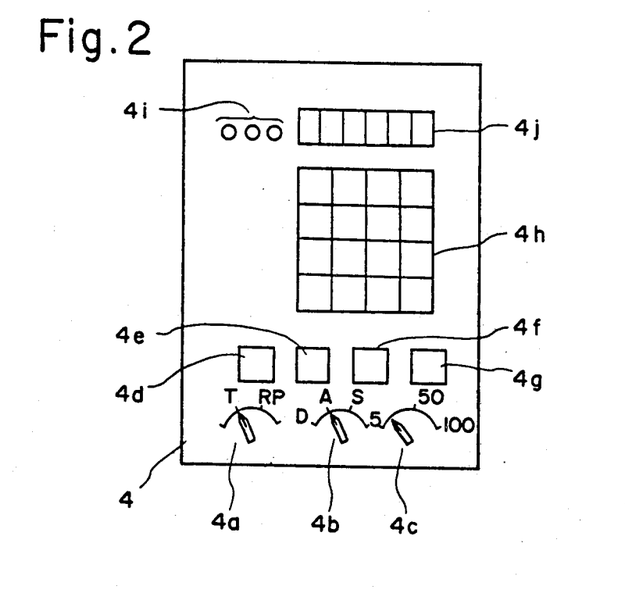
FIG. 2 is a simplified view of the surface of a teaching control panel.
Figure 3:
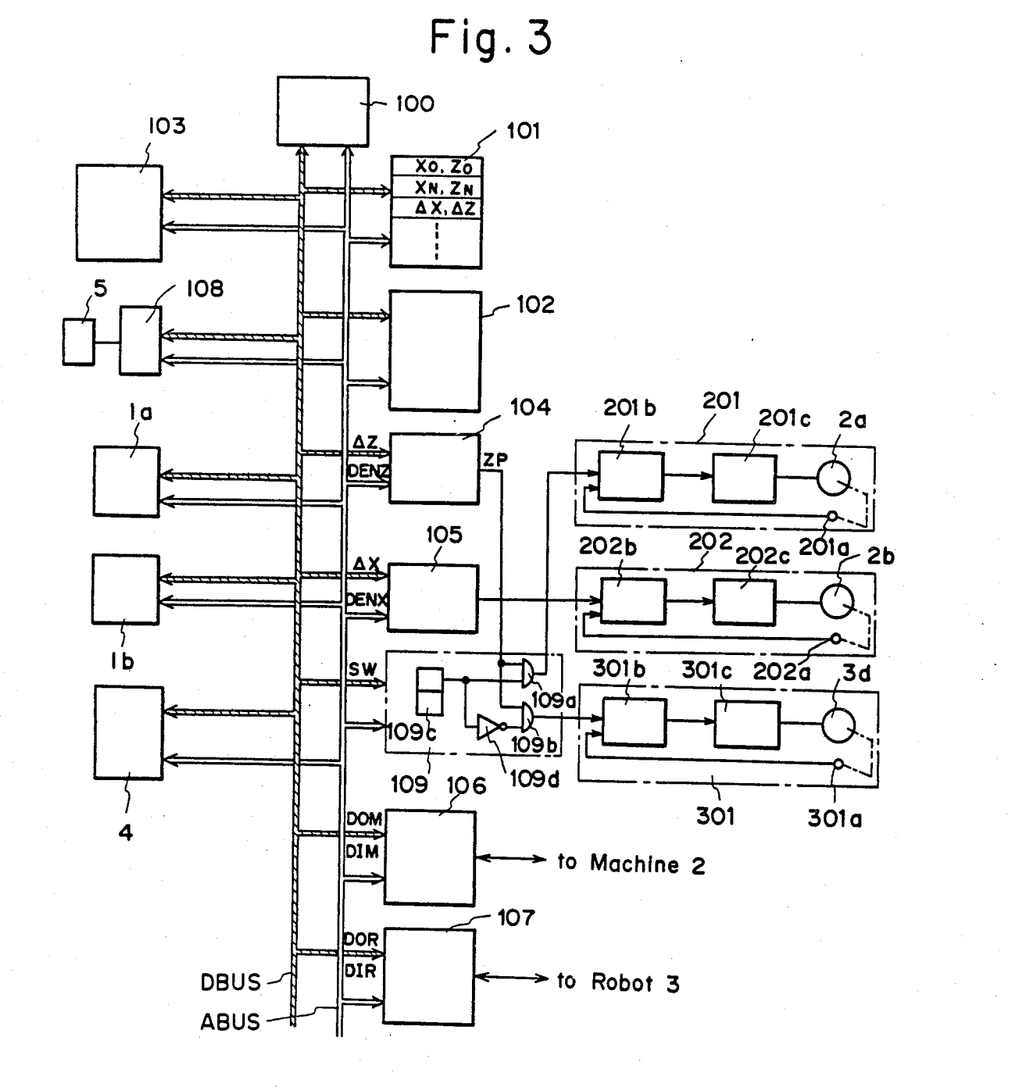
FIG. 3 is a block wiring diagram of the numerical control system.

Referring first to FIG. 1, the numerical control system of the present invention comprises a numerical control device 1, a machine tool such as a lathe 2, a robot 3, a teaching control panel 4, and a non-volatile external storage medium 5 such as a magnetic bubble memory. The numerical control device 1 has a control panel 1a and a tape reader 1b mounted on its front side and incorporates micro-processor, and such components as a data memory, working memory, control program memory, pulse distributing circuit for the X- and Z-axes, and circuitry for carrying heavy current. These units will be described later with reference to FIG. 3. Provided on the lathe 2 are two DC motors 2a, 2b which control the movement of a cutting tool along the X- and Z-axes. The robot 3 includes an arm 3b mounted on a frame 3a so as to be capable of movement vertically, longitudinally and in an arc, a hand 3c mounted at the end of the arm 3b so as to be openable and closable, and a DC motor 3d for driving the arm 3b in the direction of the spindle of the machine tool 2, that is, along the Z-axis. The teaching control panel 4, as illustrated in FIG. 2, includes: a mode selection switch 4a for selecting from among such modes as a teach mode "T" and a repeat operation mode "RP"; a data classification selection switch 4b for designating whether a numerical value entered from the teaching control panel is data "D", an address "A", or a task code "S"; an over-ride switch 4c for over-riding jog feed speed or feed speed when the robot is operating automatically; a jog button 4d which permits the arm 3b to be fed manually in the direction of the positive Z-axis; a jog button 4e which permits the arm 3b to be fed manually in the direction of the negative Z-axis; and a position record button 4f employed at the time of a teaching operation to store data in a data memory 102 (FIG. 3). The data represents the present position of the robot arm, as stored in a present position register which is incorporated in a working memory 101 (FIG. 3). The working memory 101 and data memory 102 will be described later. The teaching control panel also includes: a task code record button 4g for storing a task code in the data memory 102; numeric keys 4h for entering the numerical values of the address and the like; condition indicator lamps 4i for indicating an alarm or the like; and teaching indicator lamps 4j of six digits in decimal notation for displaying a sequence number, a task code, an address or the like. The teaching of robot command data through use of the teaching control panel 4 is carried out through a sequence which will now be described in brief.

First, the data classification selection switch 4b is set to the position "A" (address selection), after which the numeric keys 4h are operated to enter the address which designates the areas of the data memory 102, shown in FIG. 3, into which the teaching content is to be written, the data memory 102 being incorporated in the numerical control device. The address is stored in the address register of the working memory 101, also incorporated in the numerical control device, and is simultaneously displayed as the first four digits of the numerical display lamps 4j. If the data classification selection switch 4b is then set to the position "D" (data selection) and the sequence number and operating speed are set, these will likewise be stored in a speed register located in the working memory 101, and will be displayed by the numerical display lamps 4j. Depressing the jog button 4d or 4e under such conditions will permit the arm 3b to be fed to a desired position. In doing so, pulses issued by a pulse distributing circuit 104, which will be described later with reference to FIG. 3, shift the content of the present position register, located in the working memory 101, by either +1 or −1, in accordance with the direction of arm movement. Accordingly, the present position of the arm 3b is stored in the present position register at all times. If the position record button 4f is depressed after the arm has been moved as described above, then the standard or target position, the feed speed and the sequence number which have been stored in the present position register, the speed register and the like, are stored in the data memory 102 designated by the address register. This completes the teaching sequence for commanding movement of the arm 3b.

If the data classification selection switch 4b is now set to the "S" position (task code selection), and if the prescribed operations to be carried out by the hand at the desired position and by the machine tool are entered by inputting the robot task code, then depressing the task code record button 4g will load the task code in the prescribed area of the data memory 102 designated by the address register. This completes the teaching of one set of data for robot command. Repeating the above sequence allows a series of robot command data to be stored in the data memory 102 so that a full set of robot command data can be taught.

The non-volatile external storage medium 5 is capable of data transfer with the data memory 102 of the numerical control device 1. More specifically, data, which consists of machine tool command data and robot command data as edited by the numerical control device 1, is transferred for storage in the external memory 5. Then, when the robot is to perform an identical series of operations at a later date, the data is read out of the external memory 5 and stored in the data memory 102 of the numerical control device.

Turning now to FIG. 3, the numerical control system of the present invention includes: a processor 100; a working memory 101; a data memory 102; a control program memory 103; Z- and X-axis pulse distributing circuit 104, 105; circuits 106, 107 for carrying heavy electric current; an adapter 108; a switching control circuit 109; servo system 201, 202 for Z-axis and X-axis drive of the machine tool 2; and a servo system 301 for driving the robot arm along the Z-axis.

Figure 4:
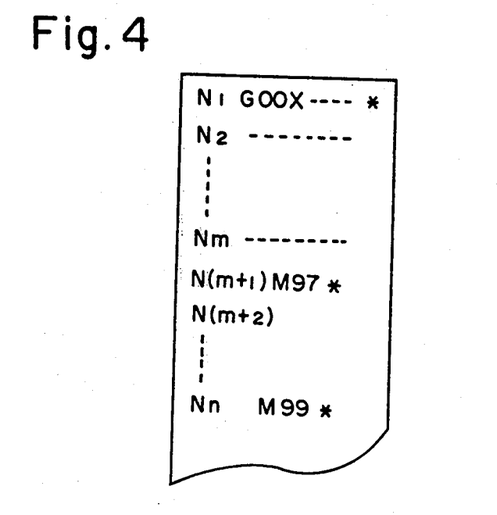
FIG. 4 illustrates the command data comprising machine tool command data and robot command data which has been edited into a single combined set of data.

The working memory 101 comprises a high-speed random access memory having a number of registers for storing the present invention position $X_o$, $Z_o$ of the workpiece or robot arm, the desired position $X_n$, $Z_n$, incremental quantities $\Delta X$, $\Delta Y$ which represent the difference between the target position and the present position, and such information as the address, task code and feed speed which are entered from the teaching control panel 4. The data memory 102 combines and records the machine tool command data and the robot command data, as shown in FIG. 4. Specifically, with reference to FIG. 4, machine tool command data is stored sequentially at sequence numbers from $N_1$ to $N_m$, and robot command data is stored sequentially at sequence numbers from $N_{(m+1)}$ to $N_n$. G00 denotes a preparation function command which designates a rapid speed in the machine tool, $M_{97}$ denotes a miscellaneous function command which designates that the next read block corresponds to robot control, and $M_{99}$ denotes a miscellaneous function command that makes the next read block the first block having the sequential number $N_1$. In other words, the machine tool command data and the robot command data are continuously stored in the data memory 102, with $M_{97}$ being designated at the begining of the robot command data and $M_{99}$ being designated at the end thereof.

The control program memory 103 stores the control program which controls the various processing procedures. The Z- and X-axis pulse distributing circuits 104, 105 receive position commands $\Delta Z$, $\Delta X$, respectively, and respond by executing pulse distributing operations. The heavy current circuits 106, 107 control the exchange of signals between the numerical control device 1 and the machine tool 2, and between the numerical control device 1 and the robot 3. DOM denotes a digital output signal representative of an M-function (miscellaneous function) for control of the machine tool 2; DIM denotes a digital input signal, such as a miscellaneous function completion signal, which indicates that the machine tool has completed a particular machining operation; DOR denotes a digital output signal which designates control of the robot arm such as the extension and rotation thereof, as well as open/close control of the robot hand; and DIR denotes a digital input signal, from a limit switch, or the like, located on the robot, which signal indicates completion of hand operation and the completion of other robot tasks. The operation of the heavy current circuits 106, 107 will be described later.

The adapter 108 controls the exchange of data between the external memory 5 and the data memory 102. The switching control circuit 109 includes AND gates 109a, 109b, a flip-flop 109c, and a NOR gate 109d. The flip-flop 109c is reset by a switching signal SW generated under the control of the control program after the completion of machining in response to machine tool command data, for example, when M97 is read. A pulse ZP from the Z-axis pulse distributing circuit 104 is therefore delivered to the Z-axis drive servo system of the robot through the AND gate 109b. On the other hand, after the robot has completed a task in response to the robot command data, such as when M99 is read, the flip-flop 109c is set in the same manner so that the pulse ZP is thenceforth delivered to the Z-axis drive servo system of the machine tool 2 through the AND gate 109a. More specifically, the numerical control device 1 uses the Z-axis pulse distributing circuit 104 for both the machine tool and the robot and permits the pulses from the pulse distributing circuit 104 to be switched over to either the robot or machine tool servos in accordance with which of the two is to be controlled.

The machine tool Z-axis drive servo system 201, the machine tool X-axis drive servo system 202 and the robot arm Z-axis drive servo system 301 comprise respective DC motors $2a$, $2b$, $3d$, pulse coders $201a$, $202a$, $301a$, which are coupled to the respective motor shafts for generating a pulse whenever the corresponding shaft has rotated by a prescribed amount; position control circuits $201b$, $202b$, $301b$, which receive the pulses from the pulse distributing circuits 104, 105 and the pulses from the pulse coders and which respond by producing an analog signal proportional to the deviation between the distributed pulses and the coder pulses; and servo units $201c$, $202c$, and $301c$ for controlling the respective DC motors on the basis of the analog signal. The DC motors are controlled so as to reduce the foregoing deviation to zero. Signals travel along an address bus ABUS and a data bus DBUS.

Figure 5:
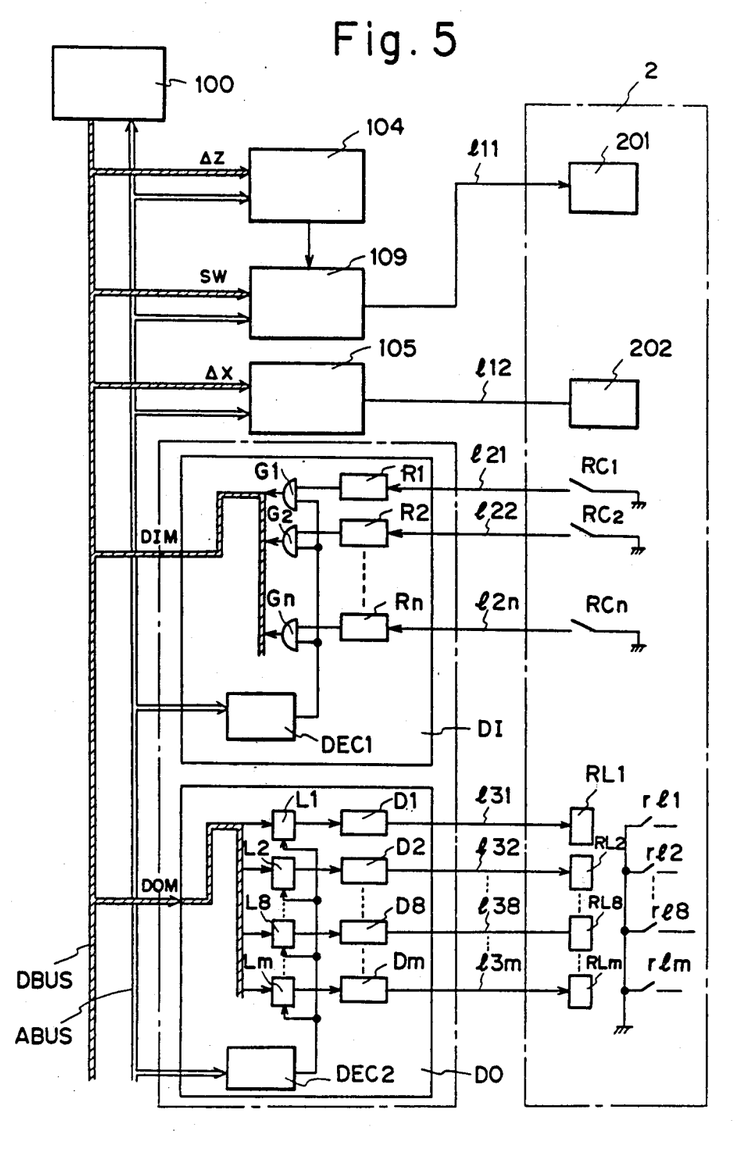
FIG. 5 is a block wiring diagram for explaining the operation of heavy current circuitry for controlling a machine tool.
Figure 6:
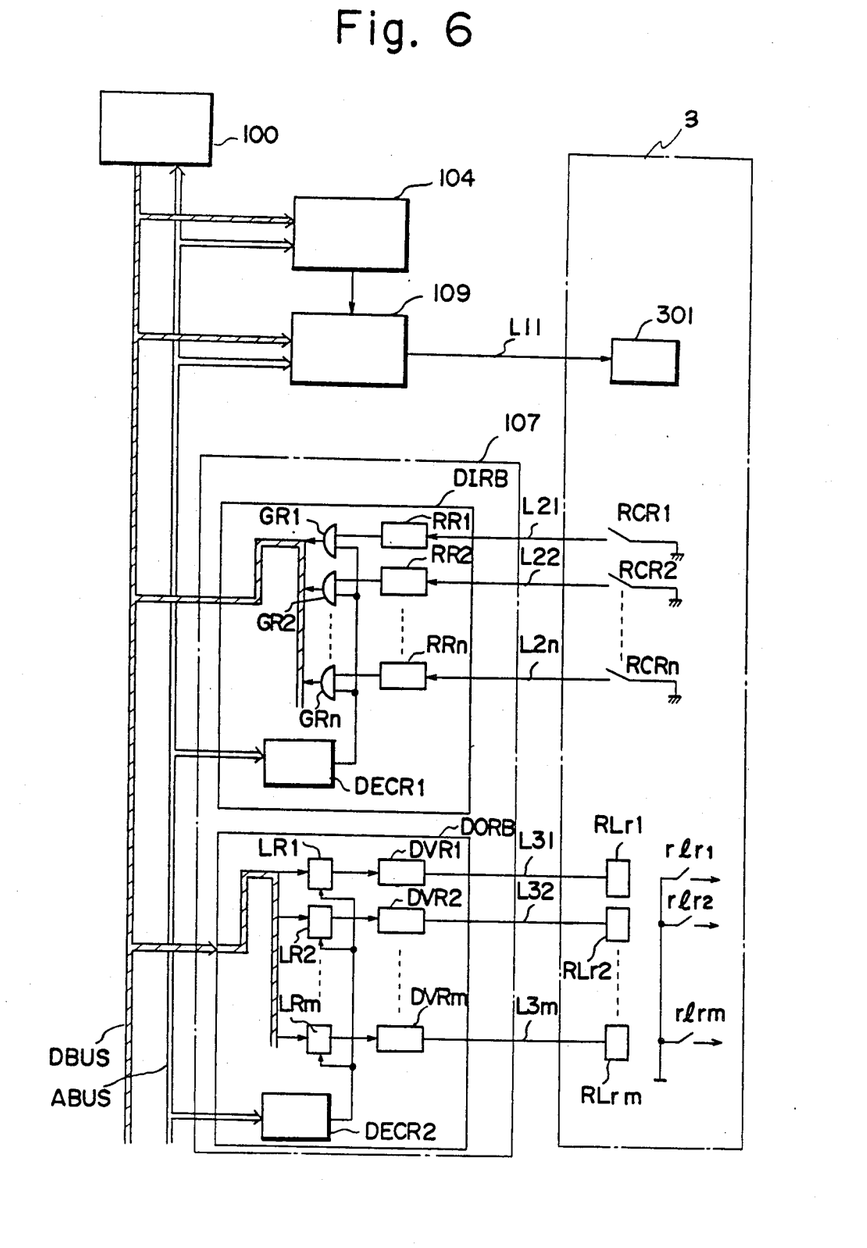
FIG. 6 is a block wiring diagram for explaining the operation of heavy current circuitry for controlling a robot.
Figure 7:
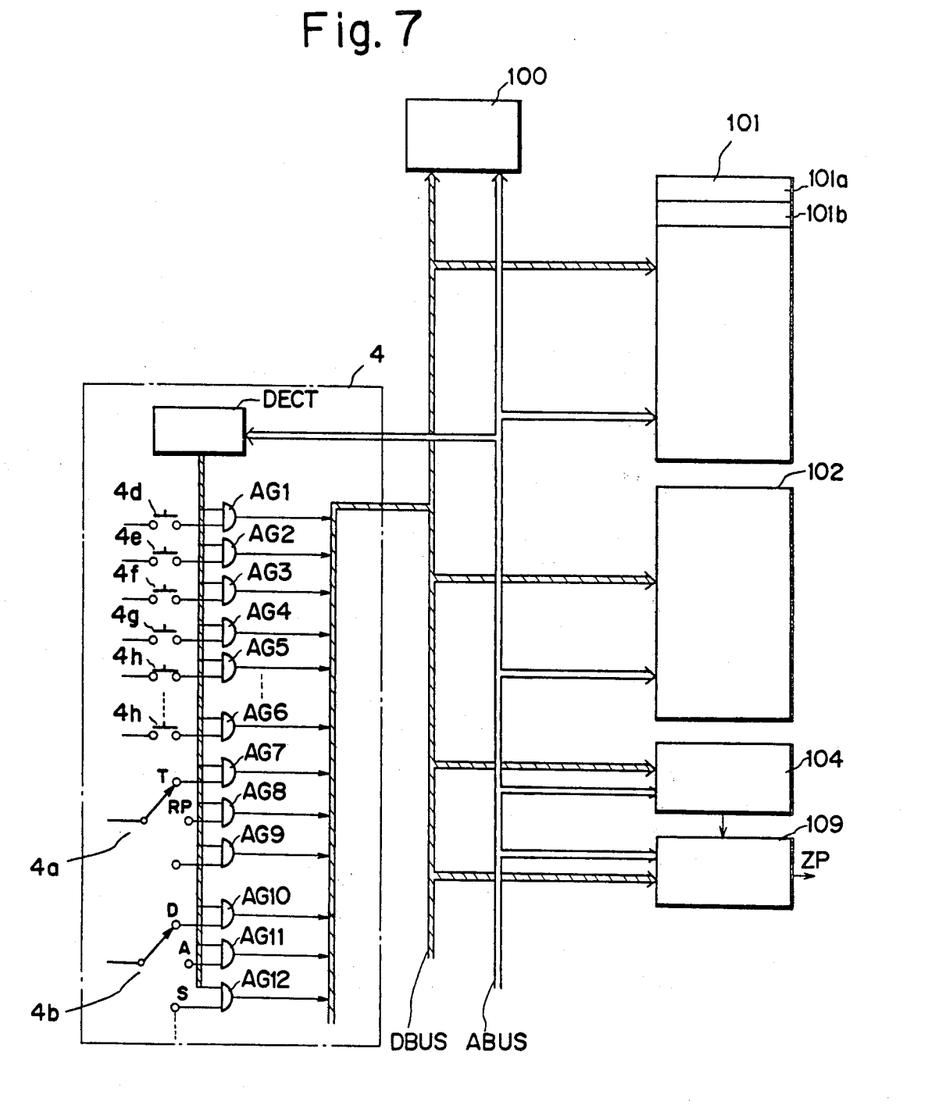
FIG. 7 is a block wiring diagram for explaining the transfer of data between a teaching control panel and a numerical control device.

Before proceeding with a description of overall system operation, reference will first be had to FIGS. 5 through 7 in order to explain the exchange of data between the machine tool 2 and the numerical control device 1, between the robot 3 and the numerical control device 1, and between the teaching control panel 4 and the numerical control device 1.

First, the exchange of data between the machine tool 2 and the numerical control device 1 can be understood from FIG. 5. It should be noted, however, that the working memory 101, data memory 102 and control program memory 103 have been deleted from FIG. 5, and that like or corresponding component parts bear the same reference symbols as those used in FIG. 3 and are not described in further detail.

A data input circuit DI includes receivers $R_1$ through $R_n$ which receive signals from various limit switches and relay contacts and the like, the signals being obtained from the machine tool side, AND gates $G_1$ through $G_n$, and a decoder $DEC_1$ which decodes address signals and opens the AND gates.

A data output circuit DO includes a number of latch circuits $L_1$ through $L_m$ for storing a two-digit (eight bit) M function command in the form of binary decimal notation (BCD), a two-digit S function command in the form of BCD, and a two-digit T function command in the form of BCD. The data output circuit DO also includes drivers $D_1$ through $D_m$ for corresponding ones of the latch circuits $L_1$ through $L_m$, the drivers being adapted to send the latch circuit output signals to the machine tool, and a decoder $DEC_2$ which allows prescribed latch circuits to be set or reset upon decoding the address signals.

Cables $l_{11}$ through $l_{12}$, $l_{21}$ through $l_{2n}$, and $l_{31}$ through $l_{3m}$ provide a connection between the numerical control unit and the machine tool to enable the exchange of data. Relay contacts $RC_1$ through $RC_n$ open and close in accordance with the on/off operation of limit switches such as overtravel limit switches and speed reduction limit switches for the $\pm X$ and $\pm Z$ directions, and permit the generated signals to be delivered to the receivers $R_1$ through $R_n$ over the cables $l_{21}$ through $l_{2n}$. Relays $RL_1$ through $RL_m$ operate in accordance with the outputs of drivers $D_1$ through $D_m$ and open or close relay contacts $rl_1$ through $rl_m$ to control the machine tool, and, in particular such items as spindle rotation, spindle speed and tool exchange.

If the command data read out from the data memory 102 of FIG. 3 is position command data (feed speed F, position information $\Delta X$, $\Delta Z$), then F, $\Delta X$, and $\Delta Z$ will be provided to the pulse distributing circuits 104, 105 which will execute a well-known pulse distributing operation and deliver output pulses $X_p$, $Z_p$ to machine tool servo control circuits 201, 202 over the cables $l_{11}$ through $l_{12}$. The pulses will drive the DC motors $2a$, $2b$ shown in FIG. 3, whereby the movement of such machine tool members as a cutter and table will be controlled as specified by the command. On the other hand, if the command data read out of the data memory 102 is a miscellaneous function command "$M_{03}$" (whether a spindle function command or tool function command), the processor 100 sends an address signal AD(m), which conforms to the M function command, out on the address bus ABUS, and sends data "03" (0000 0011) out on the data bus DBUS. The address signal AD(m), after being decoded by the decoder $DEC_2$, places only the eight latches $L_1$ through $L_8$ in a state that allows them to be set or reset, these latches being those which are to store the two-digit (eight bit) M function command. Accordingly, the data "03" (0000 0011) on the data bus DBUS sets the latches $L_1$, $L_2$ and resets the latches $L_3$ through $L_8$, and is delivered to the machine tool 2 through the cables $l_{31}$ through $l_{38}$ to open or close the relays $RL_1$ through $RL_8$. Thus, if the command "M03" is a miscellaneous function command for governing the flow of a coolant, the arrival of the command will cause a coolant to flow in the machine tool.

The reading in of the contact signals $RC_1$ through $RC_n$ from the machine tool 2 for transmission to the numerical control device proceeds as follows. Addresses AD ($\gamma C_1$), AD ($\gamma C_2$) ... AD ($\gamma C_n$) corresponding to the contact signals $RC_1$, $RC_2$ ... $RC_n$ and stored successively in address storage areas of a data memory. The processor 100, utilizing the idle time of each bus, reads out the successive addresses AD ($\gamma C_1$), AD ($\gamma C_2$) ... AD ($\gamma C_n$), and sends these addresses out on the address bus ABUS, this being carried out by starting the operation of the numerical control device. These addresses are decoded by the decoder $DEC_1$. Accordingly, if the address AD ($\gamma C_1$) appears on the address bus ABUS, and decoder $DEC_1$ responds by opening only the AND gate $G_1$, so that the contact signal $RC_1$ enters the data bus DBUS through the cable $l_{21}$, receiver $R_1$ and AND gate $G_1$ and is applied to the processor 100 which performs a processing operation in accordance with the contact signal. Thereafter the other contact signals $RC_2$, $RC_3 \ldots RC_n$ are similarly applied to the processor 100. If the read-in of $RC_n$ has been completed, the operation is such that the contact signals $RC_1$, $RC_2 \ldots$ are read in again. Though the contact signals have been read in one at a time in accordance with the foregoing operation, it is obvious that a plurality of these signals can be read in at one time by arranging it so that a plurality of AND gates open for a single address.

Next, the exchange of data between the robot 3 and the numerical control device will be described with reference to FIG. 6. Again, the working memory 101, data memory 102 and control program memory 103 have been deleted, and like or corresponding component parts bear the same reference numerals as those used in FIG. 3.

The heavy current circuit 107 for administering the exchange of data between the robot 3 and the numerical control device is almost identical in construction to the heavy current circuit 106 of FIG. 6, and comprises a data input circuit DIRB and a data output circuit DORB. The data input circuit DIRB includes: receivers $RR_1$ through $RR_n$ adapted to receive on/off signals through limit switches or the like located on the robot, where the on/off signals indicate the completion of certain robot operations, such as arm or hand operation; AND gates $GR_1$ through $GR_n$; and a decoder $DECR_1$ which decodes address signals and opens the AND gates.

The data output circuit DORB includes: latch circuits $LR_1$ through $LR_m$ for storing digital output signals such as robot task codes; drivers $DVR_1$ through $DVR_m$ for corresponding ones of the latch circuits $LR_1$ through $LR_m$, the drivers being adapted to send the latch circuit output signals to the robot; and a decoder $DECR_2$ which allows prescribed latch circuits to be set or reset upon decoding the address signals.

Cables $L_{11}$, $L_{21}$ through $L_{2n}$, and $L_{31}$ through $L_{3m}$ provide a connection between the numerical control device and the robot. $RCR_1$ through $RCR_n$ denote relay contacts or the like which open and close in accordance with the operation of various limit switches that are not shown, and which permit signals to be delivered to the receivers $RR_1$ through $RR_n$ over the cables $L_{21}$ through $L_{2n}$. Relays $RL_{r1}$ through $RL_{rm}$ operate in accordance with the outputs of drivers $DVR_1$ through $DVR_m$ and open or close relay contacts $rl_1$ through $rl_m$ to control the robot, such as the opening and closing of the robot hand.

The heavy current circuit 107 handles the exchange of data in exactly the same manner as the heavy current circuit 106 inserted between the numerical control device 1 and the machine tool 2.

The exchange of data between the teaching control panel 4 and the numerical control device 1 will now be described in conjunction with FIG. 7, in which like or corresponding component parts bear the same reference numerals as those used in FIGS. 2 and 3. The teaching control panel 4 includes a decoder DECT and AND gates $AG_i$ (i=1, 2, ...). The decoder DECT decodes addresses delivered by the processor 100 over the address bus ABUS and opens prescribed ones of the AND gates $AG_i$. As a result, the AND gates permit the data bus DBUS to receive logic signals "1", "0" which indicate the status of, for example, the jog buttons 4d, 4e, position record button 4f, task code record button 4g and the numeric keys 4h, and the status of the mode selection switch 4a and data classification selection switch 4b, etc. More specifically, the processor 100 is adapted to successively generate, repeatedly and at high speed, addresses for the push-buttons 4d through 4h and for the selection switches 4a through 4c, whereby the status of the push-buttons, namely whether the push-buttons have been depressed or not, and the status of the selection switches, namely the positions to which the selection switches have switched, are read. A prescribed teaching control operation is executed on the basis of the status of the foregoing switches.

Accordingly, when teaching robot command data, mode switch 4a is employed to select the teach mode "T". This operation is immediately recognized by the processor 100. If the address "A" position is now selected by the data classification selection switch 4b and the address is entered via the numeric keys 4h, the address data is stored in the address register 101a of the working memory 101. If the job button 4d is depressed, the processor detects this fact in the manner described above and immediately resets the flip-flop in the switching control circuit 109 of FIG. 3, so that the pulse distributing circuit 104 issues the pulse ZP. The pulse ZP causes the arm 3b of robot 3 to move. It should be noted that the content of the Z-axis present position register 101b, located in working memory 101, is shifted to the left or right each time the pulse ZP is generated, the direction of the shift depending upon the direction of robot arm movement. If the arm has arrived at the prescribed position and the jog button 4d is then released, this fact is immediately read by the processor 100 which responds by instructing the pulse distributing circuit 104 to cease the pulse distributing operation. If the position record button 4f is then depressed, the content of the present position register 101b, namely the present position of the robot arm, is loaded into the storage region of the data memory 102 as designated by the address register 101a. This completes the robot teaching operation with regard to the arm movement.

The operation of the overall system will now be described with reference to FIGS. 3 and 4.

First, the tape reader 1b, on the basis of the control program instructions, reads the machine tool command data from the tape and stores the data in the data memory 102. Next, data $M_{97}$ is stored. This is followed by operating the teaching control panel 4, so that the robot command data is stored in the data memory 102 under the control of the control program. The final data to be stored in the data memory is $M_{99}$. If an automatic running mode is designated by the control panel 1a, after storage of the machine tool command data and robot command data as described above, the processor 100, under the control program, successively reads out data from sequence number $N_1$ of the data memory 102. The machine tool 2 then begins to perform a machining operation on the basis of this data. When the machine tool command data is positioning command data or machining command data, position information $\Delta Z$, $\Delta X$ is applied to the respective pulse distributing circuit 104, 105 which execute a pulse distributing operation and deliver pulses ZP, XP. Flip-flop 109c is in the set state at this time so that the AND gate 109a is open whereas AND gate 109b is closed. In consequence, pulse ZP is directed through AND gate 109a and applied to the Z-axis drive servo system 201 which responds to rotating DC motor 2a. Hence, the cutting tool of the machine 2 is fed along the Z-axis. Meanwhile the pulse XP is applied to the X-axis drive servo system 202 which rotates the DC motor 2b, whereby the cutting tool is fed along the X-axis.

The pulse distributing circuit 104, 105 issue pulse distribution completion signals DENZ, DENX when they have distributed the number of pulses which correspond to the instructed distance of cutting tool movement. When the distributing operation has thus been completed, the machine tool command data is read out of the next block, and the machining operation continues, in accordance with the control program. If a miscellaneous function command or the like is read out of the data memory 102, the command is converted into the signal DOM and fed to the heavy current circuit 106 via the data bus DBUS. The heavy current circuit 106, upon receiving the signal DOM, causes the machine tool to perform the miscellaneous function operation, and then sends the miscellaneous function completion signal DIM out on the data bus DBUS when the miscellaneous function operation has been completed. Then, in accordance with the control program and the signal DIM, the machine tool command data is read out of the next block. The foregoing operation is repeated until machining control of the machine tool 2 has been completed. Then, when $M_{97}$ is read out of the data memory 102 at the sequence number $N_{(m+1)}$, the switch signal SW is generated to reset the flip-flop 109c.

Next, the robot command data is read out from sequence number $N_{(m+2)}$ to effect the control of such robot tasks as the loading and unloading of workpieces, the exchanging of machine tools, the cleaning of chips or scraps, etc., in accordance with the particular command data. If the data which is read out is position command data in the direction of the Z-axis, the position information ΔZ is applied to the Z-axis pulse distributing circuit 104 which sends the pulse ZP through the AND gate 109b and into the Z-axis drive servo system 301 of the robot 3. The DC motor 3d is driven by the servo system 301 and moves the robot arm 3b, shown in FIG. 1, in the direction of the Z-axis. The robot task code, when read out from the data, is converted into the signal DOR and applied to the heavy current circuit 107 which in turn controls the opening and closing operation of the robot hand, the extension of the robot arm and other such operations. When the completion of these tasks has been detected by limit switches mounted on the robot at suitable locations, a limit switch signal DIR is sent out on the data bus DBUS. After the appearance of the pulse distributing completion signal DENZ or the limit switch signal DIR, the robot command data which is stored in the next block is read out and the robot continues performing the prescribed tasks in accordance with the control program. Then, when $M_{99}$ is read out after the completion of a robot task, such as the unloading of a machined workpiece or the loading of an as yet unmachined workpiece, flip-flop 109c is set so that the Z-axis pulse distributing circuit 104 is switched over to Z-axis drive of the machine tool 2. Hence, the machine tool command data is again read out from sequence number $N_1$ so that a newly loaded, unmachined workpiece is machined by the machine tool. Thus, the machining performed by the machine tool and the various tasks performed by the robot continue until the planned number of workpieces have been machined. At this point both the machine tool and robot cease operation, and the machine tool command data and robot command data stored in the data memory are transferred to the external storage medium 5 through the adapter 5. This data is stored in the external storage medium so that it can be transferred back to the data memory 102 at some future date when the same machining operations are to be performed again. Accordingly, the robot teaching operation for that particular machining job and the editing control operation for combining the machine tool and robot command data can be omitted at that future date.

Thus, in accordance with the present invention, a separate device for control of the robot is eliminated and only a single numerical control device suffices for control of both the machine tool and the robot, thereby permitting a reduction in the cost of the system. The cost is reduced even further by allowing the pulse distributing circuit 104 to be used for both the machine tool and the robot. Moreover, since the command data obtained by combining the machine tool and robot command data is stored in the non-volatile external storage medium, teaching and editing need not be performed at any future date on which the robot is to take part in an identical machining operation. This enhances machining efficiency.

In the foregoing embodiment, the numerical control system repeatedly controls both the machining operation carried out by the machine tool and the various tasks carried out by the robot such as the loading and unloading of a workpiece after machining has been completed. In other words, the robot does not in any way intervene during a machining operation which is being carried out by the machine tool, that is, when the machining operation is actually in progress. The machine tool command data and robot command data are therefore stored in the data memory 102 continuously by turns, that is, first the machine tool command data and then the robot command data, by way of example. However, if desired, it is also possible to allow the robot to perform a particular task during the course of a machining operation. In such a case the machine tool and robot command data would be mixed as prescribed and then edited and stored in the data memory 102.

Furthermore, though the setting and resetting of flip-flop 109c was described as being controlled by the switch signal SW from the processor 100, it is obvious that this can be accomplished on the basis of a signal such as the miscellaneous function completion signal.

As many apparently widely different embodiments of the present invention may be made without departing from the spirit and scope thereof, it is to be understood that the invention is not limited to the specific embodiments thereof except as defined in the appended claims.

What we claim is:

1. A numerical control system comprising:
   a numerical control device having a robot control function and a numerical control function;
   a machine tool, controlled by said numerical control device in accordance with the numerical control function, for machining a workpiece; and
   a robot for executing prescribed tasks in cooperation with said machine tool;
   a teaching control panel, coupled to said numerical control device, for teaching robot operation by providing the robot command data from said teaching control panel; and
   an interface circuit, operatively connected between said numerical control device and said robot, for administering the exchange of data therebetween;
   said numerical control device including control means for controlling said robot in accordance with the robot control function, and memory means for storing machine tool command data and the robot command data supplied by said teaching control panel;

the machine tool command data and robot command data being successively read out of said memory means to actuate said machine tool and said robot;

said robot being instructed by the robot command data through said interface circuit to execute a prescribed task.

2. A numerical control system according to claim 1, wherein said machine tool command data and said robot command data include position command data and wherein said numerical control device further comprises:

a pulse distributing circuit, having an output, for executing a pulse distributing operation and for generating pulses on the basis of the position command data; and switching means for selectively connecting the output of said pulse distributing circuit to one of said machine tool and said robot, whereby said pulse distributing circuit is employed in controlling the movement of both said machine tool and said robot.

3. A numerical control system according to claim 1, wherein the machine tool command data and robot command data which are received separately by said numerical control device are edited into a single set of combined data which is stored in said memory means.

4. A numerical control system according to claim 1, 2 or 3, further comprising non-volatile memory means for receiving and storing the stored content of said memory means.

5. A numerical control system for machining a workpiece, comprising:

means for generating robot command data including robot position data and robot begin data;

means for generating machine tool command data including machine position data;

memory means for storing said machine tool command data and said robot command data; and processor means, operatively connected to said memory means, for processing the contents of said memory means by successively reading out of said memory means said machine tool command data and said robot command data and by generating control signals, said control signals comprising a position information signal, generated when said processor means receives one of said machine position data and said robot position data, and a switching signal generated when said processor means receives said robot begin data;

a first pulse distributing circuit, operatively connected to said processor means, for performing a pulse distribution operation in dependence upon said position information signal and for generating, as an output, a first train of distribution pulses;

a machine tool, operatively connected to said processor means, for machining the workpiece in dependence upon said control signals;

a robot, operatively connected to said processor means, for executing prescribed tasks in dependence upon said control signals; and switch means, operatively connected to said first pulse distributing circuit, said machine tool and said robot, for selectively connecting the output of said first pulse distributing circuit to one of said robot and said machine tool in dependence upon said switching signal, said first pulse distributing circuit being employed to control the movement of both said machine tool and said robot.

6. A numerical control system as set forth in claim 5, wherein said switch means comprises a flip-flop.

7. A numerical control system as set forth in claim 5, wherein said means for generating robot command data comprises a teaching control panel, coupled to said memory means, for teaching robot operation by providing said robot command data for storage in said memory means.

8. A numerical control system as set forth in claim 5, or 9, further comprising external non-volatile memory means for receiving and storing the stored content of said memory means.

9. A numerical control system as set forth in claim 5, wherein said machine tool command data further comprises miscellaneous function command data and wherein said control signals further comprise a machine tool digital output signal generated when said processor receives said miscellaneous function command data, said system further comprising a machine tool heavy current circuit, operatively connected between said machine tool and said processor means, for causing said machine tool to perform miscellaneous machining and maintenance functions in accordance with said machine tool digital output signal and for sending said processor means a miscellaneous function completion signal.

10. A numerical control system as set forth in claim 5 or 11, wherein said robot command data further comprises robot test code data and wherein said control signals further comprise a robot digital output signal generated when said processor means receives said robot test code data, said system further comprising a robot heavy current circuit, operatively connected between said processor means and said robot, for controlling the hand and arm movement of said robot in accordance with said robot digital output signal and for sending said processor means a limit switch signal upon completion of the robot movement.

11. A numerical control system as set forth in claim 5, further comprising a second pulse distributing circuit, operatively connected to said processor means and said machine tool, for performing a pulse distribution operation in dependence upon said position information signal and for generating, as an output, a second train of distribution pulses.

* * * * *

UNITED STATES PATENT AND TRADEMARK OFFICE
CERTIFICATE OF CORRECTION

PATENT NO. : 4,348,623
DATED : SEPTEMBER 7, 1982
INVENTOR(S) : KENGO KOBAYASHI ET AL.

It is certified that error appears in the above-identified patent and that said Letters Patent is hereby corrected as shown below:

```
Front page, [56] References Cited,
      "Stanley et al. ..... 318/562" should be
      --Stanley et al. ..... 318/568--.
Col. 2, line 11, "transfer of the the" should be
      --the transfer of the--.
Col. 4, line 18, "circuit" should be --circuits--;
      line 25, delete "invention".
Col. 5, line 28, after "comprise" insert --:--.
Col. 8, line 20, "job" should be --jog--;
      line 66, "to" should be --by--.
Col. 12, line 23, delete ",".
```

Signed and Sealed this

Twenty-fifth Day of January 1983

[SEAL]

Attest:

GERALD J. MOSSINGHOFF

Attesting Officer     Commissioner of Patents and Trademarks